Patented July 30, 1940

2,209,585

UNITED STATES PATENT OFFICE 2,209,585

ACID RESISTING ENAMEL

Ludwig Stuckert, Munich, Germany, assignor to Deutsche Gold- und Silber-Scheide-Anstalt, Frankfort-on-the-Main, Germany, a corporation of Germany No Drawing. Application August 18, 1938, Serial No. 225,615. In Germany September 1, 1937

7 Claims. (Cl. 106—36.2)

This invention is concerned with an acid resistant enamel which is especially suitable for enameling metal surfaces such as those of cast iron and steel.

The usual enamels now known to the art and employed for application to metal surfaces, particularly surfaces of iron or steel, contain silica, alkali metal oxides such as sodium oxide, an oxide of the alkaline earth metals such as calcium oxide, and additional oxidic ingredients such as alumina, zinc oxide, and other metal oxides. While the enamels now employed in the commercial enameling of sheet metal surfaces are satisfactory in many respects, an increased acid resistance would be appreciated by the enameling industry. However, this acid resistance should be secured without any destruction in the lustre of the finished enamel and without decreasing in any way the fusibility of the enamel composition.

It is one of the objects of this invention to prepare a sheet metal enamel, particularly adapted for the enameling of sheet metal surfaces such as those of iron and steel, which will be characterized by very high acid resistance, a high degree of lustre in the finished enamel, and ready fusibility of the enamel composition. Other objects of this invention include the attainment of these desirable properties in an improved sheet metal enamel by the substitution of lithium oxide for part of the alkali metal oxide present in my improved compositions.

Still other objects of the invention include the preparation of improved enamels by replacing part of the silica content of the sheet metal enamels by a refractory oxide such as titanium dioxide, zirconium dioxide, or mixtures of both oxides. A further object of the invention is the preparation of opaque enamels by the inclusion of cerium oxide as opacifying agent. These and still other objects of this invention will be apparent from the subsequent description.

Although the constituents entering into my improved enamel compositions having the desirable properties previously set forth may vary within considerable limits, an enamel characterized by high acid resistance, a high degree of lustre, and ready fusibility may have the following composition:

| | Per cent |
|---|---|
| $Na_2O$ | 16.0–20.0 |
| $K_2O$ | 2.6– 2.7 |
| $Li_2O$ | 1.0– 3.0 |
| $CaO$ | 7.2 |
| $Al_2O_3$ | 2.8– 3.0 |
| $ZnO$ | 1.0 |
| $SiO_2$ | 60.0–67.0 |

All these percentages are by weight, based on the total weight of the enamel composition. This composition is characterized, among other factors, by the replacement of part of the alkali metal oxide content by lithium oxide.

In preparing enamels in accordance with my invention batch compositions as follows may be fused:

Batch Composition No. 1

| | Per cent |
|---|---|
| Feldspar | 15.9 |
| Soda | 33.7 |
| Marble (calcium carbonate) | 12.8 |
| Zinc oxide | 1.0 |
| Lithium carbonate | 2.5 |
| Quartz | 55.4 |

Batch Composition No. 2

| | Per cent |
|---|---|
| Feldspar | 16.1 |
| Soda | 30.5 |
| Marble (calcium carbonate) | 12.9 |
| Zinc oxide | 1.1 |
| Lithium carbonate | 5.0 |
| Quartz | 55.9 |

If desired, a part of the silica content of my improved acid resistant enamels may be replaced by one of the refractory oxides, titanium dioxide, zirconium dioxide or by a mixture of both of these oxides.

In preparing enamels embodying the constituents and yielding the improved properties previously described, temperatures of 1300 to 1400° C. may be used for the fusion. The enamel compositions may be treated in such a manner that they are converted into granules as by "fritting," whereupon they are dried and subjected to milling.

My novel enamel compositions may be incorporated either in wet or dry enamels. For the dispersing agent I have found it most desirable to employ some clay product such as "Vallendar" clay or that dispersing agent known to the art under the trade name "Malkolloid." In order to obtain slips of suitable consistency "Vallendar" clay in the amount of 5% and "Malkolloid" in the amount of 0.5%, these percentages being by weight, may be added to the enamel composition. For opacifying my improved sheet metal enamels cerium oxide, either alone or in combination with other opacifying agents, may be incorporated with the enamel compositions. Very satisfactory opacifying effects and unusually high lustre are obtained by incorporation of 2 parts of cerium oxide and 5 parts of "Vallendar" clay in the enamel composition, these additions being per 100 parts by weight of finished enamel.

Application of my improved enamel to sheet metal surfaces may be satisfactorily carried out by a combination wet and dry process which is frequently employed with enamels of this type. The metal objects to be enameled are covered with the slip and warmed rapidly, after removal of the excess slip from the metal surfaces. The dry enamel is then uniformly applied to the surface which previously has been slightly dried. The articles are then rapidly dried, and then fired to a suitable maturing temperature, e. g. 900 to 930° C. Heating may be continued for from 2.5 to 5 minutes. The fired objects can then be given an additional wet application and again fired. No boiling through of the cerium oxide occurs if the enameling is carried out under these conditions.

The enamels as herein described are exceedingly resistant to the action of acids, as is evidenced by the fact that even prolonged boiling with concentrated hydrochloric acid does not decrease, to an appreciable extent, their lustre. High lustre of the finished enamel is one of the characteristic features of my improved products.

It should be understood that the foregoing details, proportions, and amounts specified merely as illustrative of the preferred embodiment are not to be regarded as restrictive. They have been given as exemplary of the preferred embodiment of my invention. Various changes in the percentages, amounts, procedures, temperatures, and other details previously given might be made without departing from the scope of the invention.

I claim:

1. An acid resistant enamel, especially suitable for application to sheet metal surfaces; which comprises silica, an alkali metal oxide selected from the group which consists of the oxides of sodium and potassium, zinc oxide, calcium oxide and lithium oxide, said lithium oxide being present in amounts ranging from 1 to 3%, based on the total weight of said enamel, and in no case exceeding 15% by weight of the total alkali content present in said composition said enamel being substantially completely free from fluorine.

2. An enamel highly resistant to the action of acids of the type suitable for application to cast iron surfaces wihich comprises silica, an alkali metal oxide selected from the group which consists of the oxides of sodium and potassium, zinc oxide, calcium oxide, and lithium oxide, the latter being present in amounts ranging from 1.5 to 2.0%, based on the total weight of said enamel composition said enamel being substantially completely free from fluorine.

3. An enamel which is highly resistant to the action of said acids and especially suitable for application to sheet metal surfaces which comprises silica, an alkali metal oxide selected from the group which consists of the oxides of sodium and potassium, zinc oxide, calcium oxide and lithium oxide, the latter oxide being present in amounts ranging from 1 to 3%, based on the total weight of said enamel compositions and constituting from 10 to 15% of the total alkali content said enamel being substantially completely free from fluorine.

4. An enamel highly resistant to the action of acids of the type suitable for application to sheet metal surfaces having the following composition: $Al_2O_3$, 2.8 to 3.0%; $K_2O$, 2.6 to 2.7%; $Na_2O$, 16.0 to 20.0%; $CaO$, 7.2%; $ZnO$, 1.0%; $Li_2O$, 1.0 to 3.0%; and $SiO_2$, 60.0 to 67.0%; fluorine and lead being substantially completely absent therefrom; and all percentages being by weight based on the total weight of said composition.

5. An enamel as set forth in claim 1 wherein part of the silica is replaced by one or more refractory oxides selected from the group which consists of titanium dioxide and zirconium dioxide.

6. An enamel prepared in accordance with claim 1 which contains cerium oxide.

7. An enamel prepared in accordance with claim 4 which contains, in addition, approximately 2% of cerium oxide.

LUDWIG STUCKERT.